July 24, 1962　　　　J. P. CAPPS　　　　3,045,362
APPARATUS FOR SIMULATING ATOMIC AND PLANETARY MOTION
Filed Feb. 12, 1960　　　　2 Sheets-Sheet 2
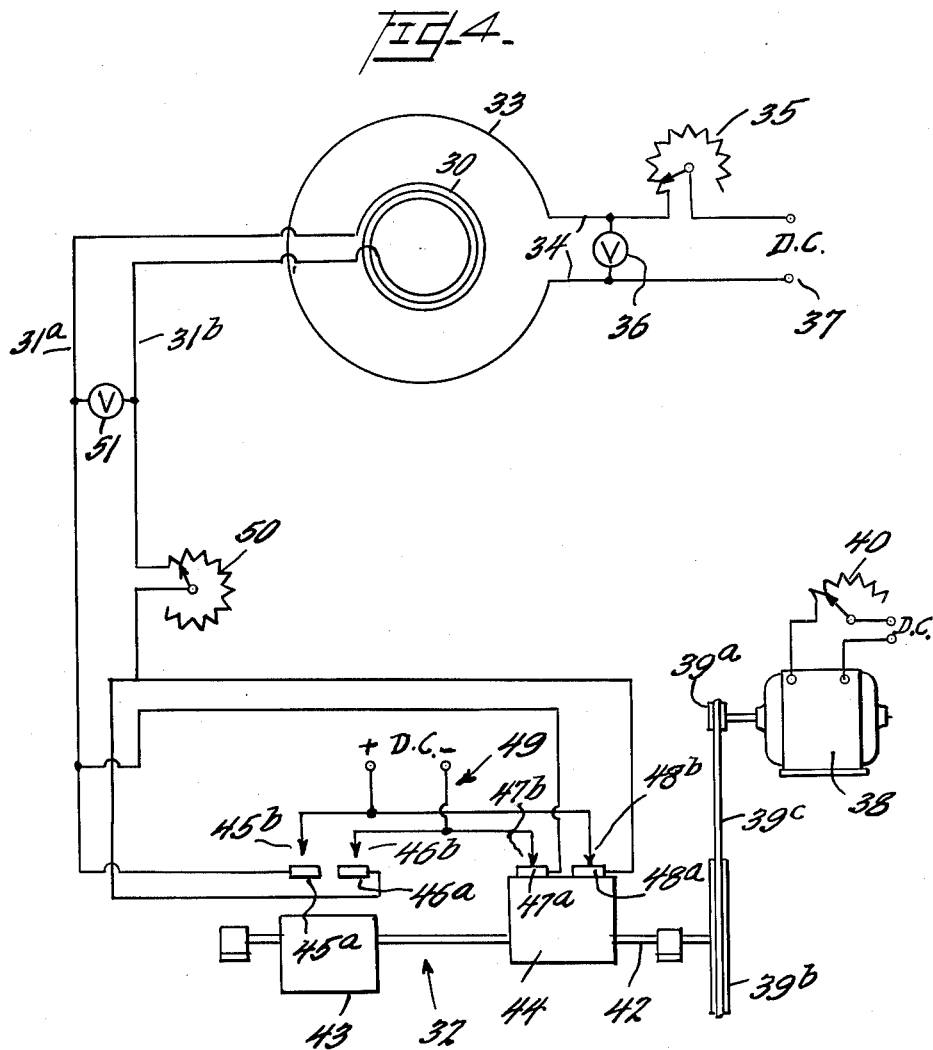
INVENTOR
John P. Capps,
BY Hugé & Newberg,
ATTORNEY

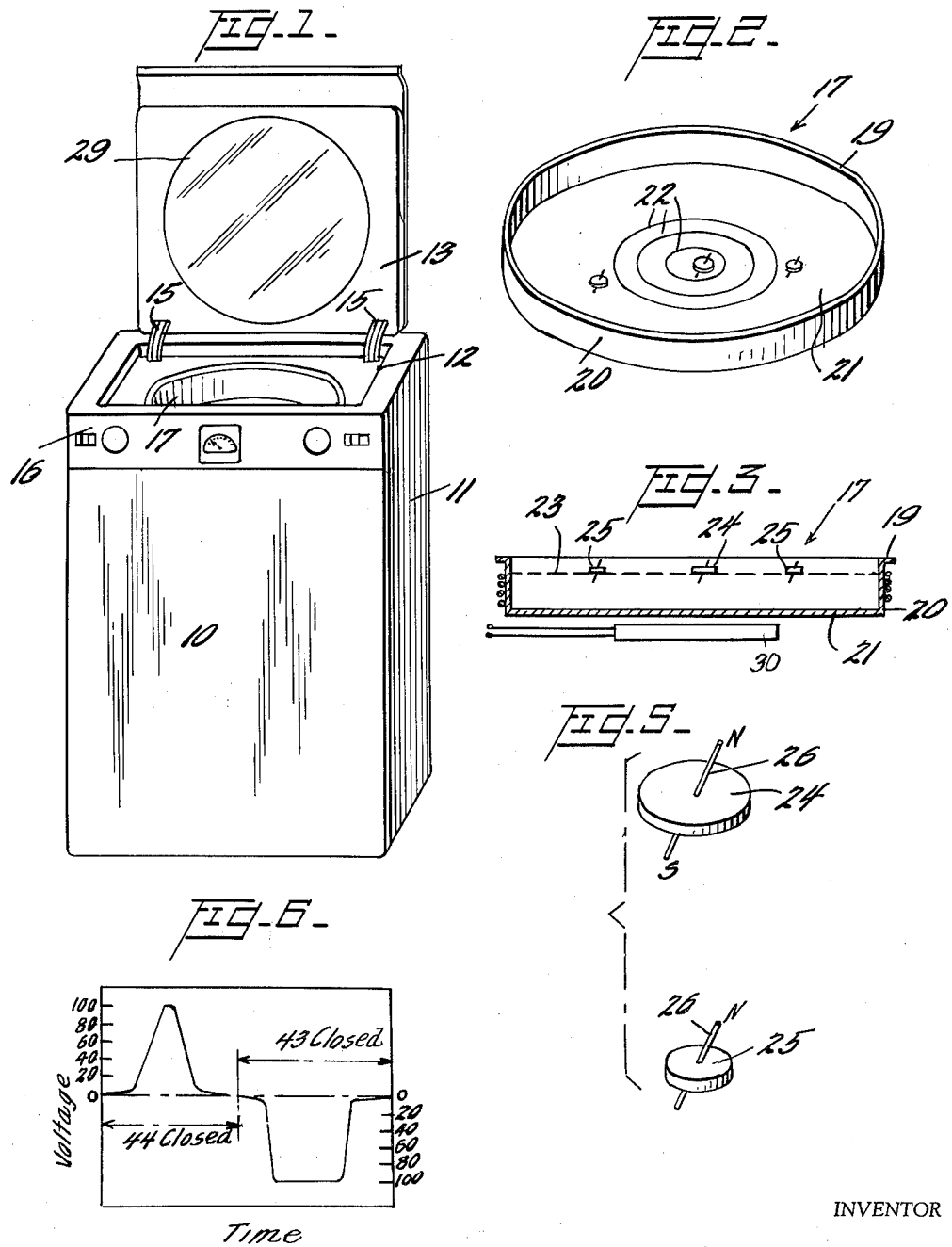

United States Patent Office 3,045,362
Patented July 24, 1962

3,045,362
APPARATUS FOR SIMULATING ATOMIC AND PLANETARY MOTION
John P. Capps, 4 Carolyn Drive, Newport News, Va.
Filed Feb. 12, 1960, Ser. No. 8,319
11 Claims. (Cl. 35—19)

This invention relates to a novel apparatus and method for simulating orbital motion. More particularly, the invention concerns a device and method for visually demonstrating, for educational and research purposes, the formation, structure, and motion of stellar bodies, the planets of the solar system, and the atoms of the elements.

In accordance with prevailing atomic theory, the atoms of the various elements are conceived as resembling miniature solar systems in that they include a nucleus, about which revolve one or more electrons, in analogy to the revolution of the planets around the sun. Thus, for example, the atom of hydrogen is considered to be built up of a central nucleus and a single orbital electron. More complex atoms have groups of electrons revolving about the nucleus in one or more orbital shells or rings. The formation of moons or satellites in the solar system or about a stellar body is regarded as arising from the splitting of a portion of the body and the movement of the separated portion into an orbit around the body in which it is held by gravitational forces.

Means heretofore available for the demonstration of atomic and planetary motion in the classroom and the laboratory have included depictions of atoms and planets or stars on flat charts. In some charts motion has been simulated by successively illuminated openings on the face of the chart. In other devices of this type, mechanical models employing balls at the ends of rods or wires are caused to move in orbital paths around a central body, to simulate atomic or planetary motion. These known devices have the drawback that the demonstrations which they provide are essentially unidimensional, and that the orbits are of a fixed and inflexible character.

In accordance with an embodiment of the present invention there is provided a device and method for simulating orbital motion in which magnetic forces are employed to cause bodies floating upon the surface of a reservoir of liquid to assume any desired position and any desired orbital path. The device and method are intended primarily for instruction and research purposes, but it will be understood that it is within the contemplation of the invention that the device may be adapted for animated display and advertising purposes.

It is accordingly an object of the invention to provide a novel educational and research apparatus and method to aid in the study of astronomy, physics, and chemistry, by visual demonstration of the formation, structure and motion of solar and atomic systems.

It is a further object of the invention to provide a device as described in the preceding paragraph in which by manipulation of fields of force such as magnetic forces from a central control panel, bodies representing stars, planets, nuclei and electrons, may be caused to assume any predetermined position and orbital path, and to move and to precess in such path.

A further object of the invention is to provide a device of the charatcer described in which a chamber encloses a reservoir of a liquid upon the surface of which the said floating bodies may be caused to assume circular or noncircular paths of movement, as desired, and in which one or several such floating bodies may be made to move simultaneously around a central point and spaced at any desired distance therefrom and from each other, by the interaction of fields of force, such as magnetic forces.

Another object of the invention is to provide a device of the character described which is readily transportable, and in which the orbital motion can be projected and enlarged for viewing on a projection screen.

These and other objects and advantages of the invention will become apparent as the description proceeds, reference now being made to the present preferred embodiment of the invention which is shown, for purposes of illustration only, in the accompanying drawings.

In the drawings:

FIG. 1 is a perspective view showing the apparatus asembled in its cabinet with the lid in raised position;

FIG. 2 is a perspective view of the liquid reservoir filled wth liquid and containing several floating bodies upon the liquid surface;

FIG. 3 is a sectional view of the reservoir;

FIG. 4 is a diagrammatic representation of the electrical coils, circuits, and energizing means for producing the magnetic forces operative upon the floating bodies;

FIG. 5 represents a pair of floating bodies provided with magnetic means, for simulating a nucleus and electron, or a sun and planet;

FIG. 6 is a graph depicting the wave form of the alternating current which is employed to cause positioning of a floating body in accordance with the invention.

Referring now to the drawings, and more particularly to FIGS. 1–3, the apparatus of the illustrated embodiment of the invention preferably comprises a cabinet generally indicated at 10, which may be made of sheet metal, plastic, wood, or other suitable material. In the illustrated embodiment, the cabinet is shown as constructed of sheet metal and comprising side walls 11, and a top panel 12 which is countersunk beneath the top edges of the side walls to define a recess for receiving cover member 13 which is hinged to the upper end of the cabinet structure as indicated at 15. A control panel 16 is mounted adjacent the upper edge of the front wall of the cabinet.

A reservoir 17 for holding liquid for supporting the floating bodies which represent the nuclei and electrons is positioned within the upper portion of the cabinet beneath top panel 12. Reservoir 17 is made of any suitable nonmagnetic material such as, for example, glass or a plastic material. Panel 12 is apertured to conform to the configuration of the reservoir so that the entire top surface area of the reservoir is visible through the aperture of panel 12. Reservoir 17 may be of any desired shape but is preferably circular. In the embodiment shown in FIG. 2, liquid reservoir 17 is in the form of a circular dish having a rim 19, a generally cylindrical wall 20, and a bottom 21. The bottom 21 has inscribed on the inner surface thereof a series of concentric circles 22 which serve to indicate the planetary or electronic orbits. Reservoir 17 is supported within the upper end of cabinet 10 beneath panel member 12 by suitable means such as inwardly extending lugs or a peripheral flange on panel member 12 which engage rim 19 of the reservoir in supporting relation.

The reservoir is filled to any desired level, as, for example, two-thirds full, with a fluid medium, for example a mobile liquid, such as water, glycerine, or ethylene glycol. The liquid surface, indicated generally in FIG. 3 at 23, serves to support for free movement thereof one or more floating bodies 24, 25. The floating bodies are depicted in FIGS. 3 and 5 and comprise small discs of any suitable dimensions, made of a nonmagnetic material, such as a plastic material, having a specific gravity less than 1, and provided with a magnetic member 26 set at an angle to the plane of the float, and having its poles extending above and below the float body. The North poles of both float members 24 and 25 must both be pointing in the same direction, either Up or Down, depending upon the direction of the current flowing through coil 30.

Since the sun or the nucleus of an atom has a larger mass than the orbital bodies which revolve around it, the floating body 24 used to represent the sun or nucleus, is larger than the bodies 25 which are used to represent electrons, or planets, and the strength of the magnetic member carried by the floating body 24 is greater than that of the magnetic member carried by the body or bodies 25.

As shown in FIG. 1, cabinet cover 13 has mounted on its inner face a reflecting mirror 29, which may be employed to project the movements of the floating bodies 24 and 25 to a suitable viewing screen through an enlarging and projecting means of any conventional type (not shown), thus permitting demonstrations to large groups of persons.

Located within cabinet 10 and below the reservoir 17 is the mechanism for operating the device, depicted generally in FIG. 4. An inner flat disc coil of wire 30, when energized by an alternating current, produces a magnetic field which acts upon floating bodies 24 and 25. Coil 30 is circular in shape and is positioned with its center corresponding with the center of the reservoir 17. The coil may include any suitable number of turns, depending upon the diameter of the reservoir and the strength of the magnetic field desired; for example, 30 turns may be used. Coil 30 is energized via conductors 31a and 31b by a current drawn from motor-driven reversing switch mechanism shown generally at 32, to be described more fully hereinafter. Surrounding the reservoir 17 is a neutralizing coil 33, energized by direct current from source 37, through conductors 34 and adjusted by rheostat 35, the voltage across coil 33 being indicated by voltmeter 36. The impressed voltage at 37 is advantageously about 10–12 volts, derived, for example, from a storage battery or rectifier. Neutralizing coil 33 produces its own magnetic field which serves to neutralize to a predetermined degree, depending on the current flowing through the coil, the repelling effect of the magnet carried by the inner floating body 24 upon the magnet carried by the outer floating body or bodies 25. Thus, the current through coil 33 may be adjusted by rheostat 35 to cause float 25 to move in a smaller or larger orbit about float 24, depending upon the amount of current passing through coil 33.

Reversing switch 32 is driven by an adjustable speed direct current motor 38 which drives shaft 42 of switch 32 by means of pulleys 39a and 39b and drive belt 39c. Motor 38 is energized from a direct current power supply through a speed adjusting rheostat 40. Reversing switch 32 includes a pair of cams 43 and 44 of different peripheral length. As will best be seen in FIG. 4, cam 43 engages two sets of cooperating switch contacts 45a—45b and 46a—46b. Similarly, cam 44 engages two sets of cooperating switch contacts 47a—47b and 48a—48b. Switch contacts 45b and 48b are connected in parallel with each other and to the positive side of the direct current power supply generally indicated at 49. Switch contacts 46b and 47b are connected in parallel with each other and to the negative side of direct current power supply 49. Also, switch contacts 45a and 47a are each connected to conductor 31a leading to coil 30, and switch contacts 46a and 48a are each connected to conductor 31b leading to the opposite side of coil 30.

Cams 43 and 44 are mounted out of phase with each other on shaft 42 in such manner that only one of the two cams is in engagement with its corresponding switch contacts at any given time. The cams are so designed that there is a brief time lapse between the time that one cam passes out of engagement with its corresponding sets of switch contacts, and the other cam passes into engagement with its sets of switch contacts. Thus, coil 30 is alternately connected to the direct current power source 49 through the switch contacts controlled by one or the other of the two cams 43, 44.

In the position of the cams 43, 44 illustrated diagrammatically in FIG. 4, cam 44 is in closing engagement with contacts 47a—47b, 48a—48b. Hence, conductor 31a of coil 30 is connected to the negative side of the direct current power supply 49 through contacts 47a—47b and conductor 31b of coil 30 is connected to the positive side of direct current supply 49 through switch contacts 48a, 48b. When cam 44 moves out of engagement with its corresponding switch contacts and cam 43 closes switch contacts 45a—45b and 46a—46b, the polarity connections of coil 30 are reversed as conductor 31a is connected to the positive side of direct current supply 49 through switch contacts 45a—45b and conductor 31b is connected to the negative side of the direct current supply 49 through contacts 46a—46b. The peripheral lengths and contours of cams 43 and 44 are so designed that cam 43 is engaged with its respective switch contacts longer than cam 44 is engaged with its switch contacts. As a result, conductors 31a and 31b are respectively connected to the positive and negative sides of direct current power supply 49 for a greater length of time than they are respectively connected to the reverse polarities. The resulting instantaneous voltage across coil 30 is shown in the graph of FIG. 6. It will be noted that the voltage pulse across coil 30 while cam 43 is closed is of longer time duration than the pulse when cam 44 is closed, and also that the voltage pulse across coil 30 when cam 44 is closed is quite peaked, as compared to the voltage pulse across coil 30 when cam 43 is closed. The wave shapes of the respective voltage pulses when cams 43 and 44 are closed is due to the interrelation between the inductance of coil 30 and the lengths of time that the respective cams are closed.

The magnitude of the current to coil 30 may be manually adjusted by means of rheostat 50 which is connected in series with conductor 31b. Also, the voltage across coil 30 may be measured by means of voltmeter 51. The rheostats 35 and 50 and voltmeters 36 and 51 are mounted on control panel 16.

The operation of the novel apparatus of this invention is as follows: Reservoir 17 is filled approximately two-thirds full with water. Energizing current is applied to inner coil 30 by means of motor driven reversing switch 32, thus creating a magnetic field under the center of the reservoir. The current applied to coil 30 has a distorted wave form as shown in FIG. 6, produced by the varying cycle of cams 43 and 44. Floating body 24, representing the nucleus of an atom, or the sun of a solar system, is placed on the surface of the water, and immediately assumes a position directly over the magnetic center of coil 30. A floating body 25 is then placed on the surface of the water, with the North pole of its magnet pointing in the same direction as the North pole of the magnet of body 24, and because of its smaller mass, moves to a position determined by the interaction of the magnetic force of attraction created by coil 30 and the repelling magnetic force of the magnet of floating body 24. Floating body 25 will then, by virtue of the angle at which its magnetic member 26 is set, and at a point at which the speed of rotation of shaft 42 is such that the frequency of the alternating current flowing through coil 30 approximates the natural resonance frequency of the magnetic member of floating body 25, commence to spin, precess and orbit around floating body 24. The frequency of the electrical pulses to coil 30 is controlled by adjusting rheostat 40 to control the speed of motor 38. The amplitude of the current through coil 30 is also an important factor in causing body 25 to properly orbit about body 24. The amplitude of the current in coil 30 may be adjusted by means of rheostat 50. When the plane of coil 30 is parallel to the surface 23 of the water, the orbit assumed by floating body 25 will be circular, but by slightly tilting coil 30 from this parallel position, the orbit can be caused to assume the path of an ellipse.

Additional floating bodies 25 may be placed on the liquid surface, to represent a plurality of electrons or planets revolving or orbiting about a nucleus or a sun. The additional floating bodies 25 may be caused to orbit in radially displaced concentric paths by utilizing magnets of different strengths on these bodies so that their magnetic interaction with the magnetic fields of coil 30 and of the magnet of floating body 24 causes the plurality of floating bodies 25 to orbit at different radial distances from the center of coil 30.

When neutralizing coil 33 is energized by current transmitted through rheostat 35, a magnetic field is set up around the periphery of the reservoir 17, which partially offsets the repelling effect of floating body 24, causing floating body 25 to move in a smaller or larger orbit around body 24, as the case may be. By suitable adjustment of current fed to each coil, it is possible to simulate the birth of a moon, by causing floating body 25 to move outward from body 24, while at the same time commencing to revolve around it.

While in the illustrated embodiment of the invention, magnetic forces have been employed to cause the orbital movement of the solar or atom simulating bodies, it is within the scope of the invention to employ electrostatic forces to cause this movement, with the electrostatic forces being carried by the movable bodies and by the field of force surrounding the bodies. The term "field of force" or "electrical field of force" as used in the specification and claims, is hereby defined to include magnetic, electromagnetic, or electrostatic fields of force.

It can be seen from the foregoing that there is provided in accordance with this invention a novel apparatus for simulating orbital motion which may be used to demonstrate visually the formation, structure, and motion of the bodies in the solar system, or the formation and structure of the atoms of various elements.

While there has been shown and described a particular embodiment of the invention, it will be apparent to those skilled in the art that various changes and modifications may be made therein without departing from the invention and, therefore, it is aimed to cover all such changes and modifications as fall within the true spirit and scope of the invention.

What I claim is:

1. An apparatus for demonstrating orbital motion of solar and atomic bodies comprising at least two floatable bodies each carrying with it a field of force, means for floating said bodies in a fluid medium, the field of force of one of said bodies being greater than that of the other of said bodies, and means for providing an operating field of force, said fields of force of said bodies and said operating field of force being so proportioned and adjusted as to interact with each other to cause said one body to assume a substantially fixed position relative to the operating field and to cause said other body to orbit around said one body.

2. An apparatus for demonstrating orbital motion of solar and atomic bodies comprising at least two floatable bodies each carrying with it a magnetic field, means for floating said bodies in a fluid medium, the magnetic field of one of said bodies being greater than that of the other of said bodies, and means for providing an operating magnetic field, said magnetic fields of said bodies and said operating magnetic field being so proportioned and adjusted as to interact with each other to cause said one body to assume a substantially fixed position relative to the operating magnetic field and to cause said other body to orbit around said one body.

3. An apparatus for demonstrating orbital motion of solar and atomic bodies comprising at least two magnetic floatable bodies, a fluid medium for floatingly receiving said bodies, each of said bodies including a float element capable of floating the respective body in said fluid medium, a magnetic member carried by each of said bodies, the magnetic member of one of said bodies having greater magnetic strength than that of the other of said bodies, an electromagnetic field means disposed adjacent said fluid medium and in magnetically interacting relation with said bodies, means for applying successive electrical voltage pulses of opposite polarity to said field means, and means for adjusting the frequency of said voltage pulses, whereby when said electromagnetic field means is energized said one body will assume a substantially fixed position in said fluid medium and said other body will move orbitally about said one body.

4. An apparatus as defined in claim 3 in which said means for applying successive electrical voltage pulses of opposite polarity to said field means includes a direct current power supply and a motor driven reversing switch connected to said field means and to said power supply, said reversing switch being actuated to reverse the polarity connections of said field means to said power supply at a predetermined adjustable frequency.

5. An apparatus as defined in claim 4 in which said reversing switch includes means for applying voltage pulses of one polarity of longer duration than voltage pulses of the opposite polarity.

6. An apparatus for demonstrating orbital motion of solar and atomic bodies, comprising a fluid reservoir open for observation on a surface thereof, at least two magnetic floatable bodies, the first of which is larger than the others, an electromagnetic field means disposed contiguous said fluid reservoir, means connected to said field means for energizing said field means with successive electrical voltage pulses of opposite polarity and with the pulses of one polarity being of longer time duration than those of the opposite polarity, and means for adjusting the frequency of said voltage pulses, whereby when said field means is energized said larger first magnetic body when floated on a liquid placed in said fluid reservoir will assume a substantially fixed position therein and said other magnetic bodies when floated on a liquid placed in said reservoir will orbit in a path around said first larger substantially fixed magnetic body.

7. An apparatus for demonstrating orbital motion of solar and atomic bodies, comprising a fluid reservoir open for observation on the upper surface thereof, two magnetic floatable bodies, the first of which is larger than the second, a disc-like electrical coil positioned beneath said reservoir in contiguous relation thereto, means for applying successive electrical voltage pulses of opposite polarity to said coil and with the pulses of one polarity being of longer time duration than those of the opposite polarity, and means for adjusting the frequency of said voltage pulses, whereby when said coil is energized said larger first magnetic body when floated on a liquid placed in said fluid reservoir will assume a substantially fixed position therein and said second magnetic body when floated on a liquid placed in said reservoir will orbit in a path around said first larger substantially fixed magnetic body.

8. The apparatus defined in claim 7 in which the plane of said electrical coil is adjustable and said electrical coil being adapted to be tilted relative to said reservoir to thereby control the shape of the orbital path of said second magnetic body about said first magnetic body.

9. The apparatus defined in claim 7 including a second electrical coil positioned contiguous said reservoir, means connecting said second electrical coil to a direct current power supply, and means for adjusting the direct current passing through said second coil.

10. An apparatus for demonstrating orbital motion of solar and atomic bodies, comprising a fluid reservoir open for observation on a surface thereof, an electromagnetic field means disposed contiguous said fluid reservoir, means connected to said field means for energizing said field means with successive electrical voltage pulses of opposite polarity and with the pulses of one polarity being of longer time duration than those of the opposite polarity, means for adjusting the frequency of said voltage pulses, a first magnetic body and at least one additional magnetic body floatingly positioned in said fluid reservoir, each of said magnetic bodies carrying with it a magnetic field, the magnetic field of said first body being of greater strength than the magnetic fields carried by said additional magnetic bodies, whereby said first magnetic body will assume a substantially fixed position in said reservoir and said additional bodies will assume orbital paths about said first body when said electromagnetic field means is energized at a frequency corresponding to the resonant magnetic frequency of said additional bodies.

11. The apparatus of claim 10 in which each of the magnetic floatable bodies includes a float portion and magnetic member set at an angle to the plane of said float portion and having its poles extending above and below the float body.

References Cited in the file of this patent

UNITED STATES PATENTS

| | | |
|---|---|---|
| 1,616,280 | Prins | Feb. 1, 1927 |
| 1,736,613 | McCoshen | Nov. 19, 1929 |
| 2,074,363 | Burke | Mar. 23, 1937 |

FOREIGN PATENTS

| | | |
|---|---|---|
| 619,633 | France | Jan. 4, 1927 |

UNITED STATES PATENT OFFICE

CERTIFICATE OF CORRECTION

Patent No. 3,045,362　　　　　　　　　　　　　July 24, 1962

John P. Capps

It is hereby certified that error appears in the above numbered patent requiring correction and that the said Letters Patent should read as corrected below.

Column 6, line 14, for "adjustable" read -- adjusted --.

Signed and sealed this 30th day of October 1962.

(SEAL)
Attest:

ERNEST W. SWIDER
Attesting Officer

DAVID L. LADD
Commissioner of Patents